United States Patent
Tussy

(10) Patent No.: US 9,604,500 B2
(45) Date of Patent: Mar. 28, 2017

(54) LOW PROFILE CASTER

(71) Applicant: Kevin Alan Tussy, Las Vegas, NV (US)

(72) Inventor: Kevin Alan Tussy, Las Vegas, NV (US)

( * ) Notice: Subject to any disclaimer, the term of this patent is extended or adjusted under 35 U.S.C. 154(b) by 0 days.

(21) Appl. No.: 14/643,901

(22) Filed: Mar. 10, 2015

(65) Prior Publication Data
US 2015/0251490 A1    Sep. 10, 2015

Related U.S. Application Data

(60) Provisional application No. 61/950,723, filed on Mar. 10, 2014.

(51) Int. Cl.
*B60B 33/08* (2006.01)
*B60B 33/00* (2006.01)
*B60B 19/14* (2006.01)

(52) U.S. Cl.
CPC .......... *B60B 33/08* (2013.01); *B60B 33/0005* (2013.01); *B60B 33/0015* (2013.01); *B60B 33/0063* (2013.01); *B60B 19/14* (2013.01); *B60B 2900/351* (2013.01); *B60B 2900/531* (2013.01); *Y10T 16/188* (2015.01)

(58) Field of Classification Search
CPC ..... Y10T 16/188; Y10T 16/191; B60B 33/08; B60B 33/001; B60B 33/0018; B60B 33/0002; B60B 33/0005; B62B 2301/252; B62B 5/0083; A45C 5/14; A45C 5/143; A45C 5/142

See application file for complete search history.

(56) References Cited

U.S. PATENT DOCUMENTS

| | | | | |
|---|---|---|---|---|
| 348,887 A | * | 9/1886 | Carr | B60B 33/08 16/24 |
| 365,809 A | * | 7/1887 | Hambujer | B60B 33/08 16/24 |
| 956,969 A | * | 5/1910 | Husey | B60B 33/08 16/24 |
| 1,383,396 A | * | 7/1921 | Friend | A47B 91/14 16/24 |
| 1,438,543 A | * | 12/1922 | Michaels | B60B 33/08 16/24 |
| 1,485,674 A | * | 3/1924 | Glowaski | B60B 33/08 16/24 |
| 1,542,231 A | * | 6/1925 | Garfield | A45C 5/14 16/24 |
| 2,225,753 A | * | 12/1940 | Milich | B60B 33/08 16/26 |

(Continued)

FOREIGN PATENT DOCUMENTS

JP     2010280254 A * 12/2010

*Primary Examiner* — Chuck Mah
(74) *Attorney, Agent, or Firm* — Weide & Miller, Ltd.

(57) ABSTRACT

A caster including a plurality of rollers and a base including a plurality of openings through which the plurality of rollers protrude. The caster further includes a retainer disposed over the base and the plurality of rollers. The retainer is configured to maintain the position of the rollers protruding through the openings. The caster has at least one attachment surface that includes a double-sided adhesive. The attachment surface thereby adheres the caster to an object to be moved. The ratio of a width of the caster to a height of the castor is greater than 2:1.

10 Claims, 7 Drawing Sheets

(56) References Cited

U.S. PATENT DOCUMENTS

| | | | | |
|---|---|---|---|---|
| 2,659,926 A * | 11/1953 | Wein | B60B 33/08 16/24 |
| 2,779,965 A * | 2/1957 | Schilberg | B60B 33/08 16/24 |
| 3,239,022 A * | 3/1966 | Dolphin | B66F 9/07577 16/24 |
| 3,285,447 A * | 11/1966 | Junion | B62B 5/0083 16/24 |
| 3,557,401 A * | 1/1971 | Jenkins | B60B 33/08 16/26 |
| 3,559,802 A * | 2/1971 | Eidus | B60B 33/08 16/18 R |
| 3,577,620 A * | 5/1971 | Hoffman | B60B 33/08 16/26 |
| 3,744,083 A | 7/1973 | Jenkins | |
| 3,797,067 A * | 3/1974 | Rodgers | B60B 33/08 16/223 |
| 4,149,735 A * | 4/1979 | Blackburn | A63C 17/004 280/843 |
| 4,203,177 A | 5/1980 | Kegg et al. | |
| 4,285,550 A * | 8/1981 | Blackburn | B65G 39/025 16/25 |
| 4,382,637 A * | 5/1983 | Blackburn | B65G 39/025 16/25 |
| 4,402,108 A * | 9/1983 | Pannwitz | B60B 33/08 16/26 |
| 4,404,707 A | 9/1983 | Walker | |
| 5,136,751 A * | 8/1992 | Coyne | B60B 33/00 16/29 |
| 5,207,454 A * | 5/1993 | Blankenburg | A63C 17/006 280/11.226 |
| 5,375,619 A * | 12/1994 | Foster | B65G 25/065 137/109 |
| 5,409,265 A * | 4/1995 | Douglass | A63C 17/01 280/11.27 |
| 6,038,734 A * | 3/2000 | Facchin | B60B 33/08 16/24 |
| 6,055,704 A * | 5/2000 | Leibman | B60B 33/06 16/32 |
| 6,134,747 A * | 10/2000 | Leibman | B60B 33/0002 16/24 |
| 8,827,879 B2 * | 9/2014 | Nicholas | A63B 21/0004 482/131 |
| 8,943,648 B2 * | 2/2015 | Fanourgiakis | F16M 11/24 16/24 |
| 2003/0115716 A1 * | 6/2003 | Polevoy | A47C 19/024 16/26 |
| 2004/0003438 A1 * | 1/2004 | Eby | A01H 5/10 800/312 |
| 2007/0074372 A1 * | 4/2007 | Polevoy | A47C 7/006 16/26 |
| 2008/0244870 A1 * | 10/2008 | Chase | A47B 91/06 16/42 R |
| 2013/0139351 A1 * | 6/2013 | Smith | A47B 91/06 16/30 |
| 2015/0210114 A1 * | 7/2015 | Spektor | B60B 33/0076 16/35 R |

* cited by examiner

LOW PROFILE CASTER

CROSS REFERENCE TO RELATED APPLICATION

This application claims the benefit of and priority to U.S. Provisional Application No. 61/950,723 which was filed Mar. 10, 2014, the contents of which are hereby incorporated by reference.

BACKGROUND

The present invention relates generally to caster assemblies for easing movement of large and/or heavy items.

People often must move heavy and or bulky items such as furniture, boxes, etc. A wide variety of tools and equipment to make moving such items easier have been developed, but such equipment is itself often bulky, inconvenient, or unavailable at the time it is needed.

One such equipment is a caster. As is known, a caster is comprised of a wheel that may swivel to be oriented in any direction. The wheel is mounted via an axle to the bottom of a cart or other object to be moved. This is typically done via fasteners such the caster is mounted in a permanent fashion. Many casters are lockable so that once an item is in a desired position, it can be fixed in that position.

Typical casters have a number of drawbacks. In order to provide sufficient support, the casters typically are permanently mounted to an item via fasteners. In this manner, the castors can withstand the forces and torques applied on the caster structure when the item is moved. However, this attachment also creates an inability to quickly place or install a caster on an item to move the item. Furthermore, the casters themselves are bulky and are rarely considered to be aesthetically pleasing. Thus in many instances a user does not want the caster permanently installed on the item. The present invention overcomes these problems, providing an easy, convenient tool for rolling or sliding large or bulky items.

SUMMARY

The disclosed embodiments have been developed in light of the above and aspects of the invention may include caster comprising: at least one roller and a base that includes at least one opening. The at least one roller may protrude through the at least one opening. The base may further comprise a cavity and at least one planar attachment surface configured to attach to an object to be moved.

The caster may further comprise a retainer disposed within the cavity. A top most surface of the retainer may be disposed coplanar with or below the at least one planar attachment surface. The retainer may also comprise at least one concavity shaped to correspond with the at least one roller so that the at least one roller may be retained within the at least one concavity.

According to some embodiments, the caster may have a ratio of a width to a height greater than 2:1. In other embodiments the ratio of a width of the caster to a height of the caster is greater than 4:1.

In further embodiments, a cover is disposed over the retainer such that it is coplanar with the at least one planar attachment surface. The at least one planar attachment surface may be configured to be parallel with a surface over which the object is moved. A double-sided adhesive may be adhered to the at least one planar attachment surface; and a peelable adhesive cover may be disposed over the double-sided adhesive. The peelable adhesive cover may be removable from the double-sided adhesive. In some embodiments, the at least one roller is an omnidirectional roller in a shape of a spherical ball.

According to further aspects of the invention, there may be a low profile caster comprising a plurality of rollers, a base including a plurality of openings through which the plurality of rollers protrude, and a retainer disposed over the base and the plurality of rollers. The retainer may be configured to maintain a position of the rollers protruding through the openings.

The caster may further include at least one attachment surface comprising a double-sided adhesive. The attachment surface may be configured to adhere the caster to an object to be moved. In some embodiments, a ratio of a width of the caster to a height of the castor is greater than 2:1. In other embodiments, the ratio is greater than 4:1.

The at least one attachment surface of the low profile caster may be a planar surface. The at least one attachment surface may be configured to be parallel to a surface over which the object is moved. In some embodiments, the plurality of rollers are omnidirectional rollers in a shape of a spherical balls.

The retainer of the low profile caster may comprise a plurality of concavities. The concavities may be shaped to correspond with the plurality of rollers, and the concavities may be configured to cover the plurality of rollers.

In some embodiments, the plurality of rollers are formed from a plastic material. The retainer and the base may be formed from low-friction, plastic materials.

Other aspects of the invention may include a method of moving an object, the method including the steps of obtaining at least one low profile disposable caster as described above removing the peelable adhesive cover disposed over the double-sided adhesive; adhering the at least one low profile to a surface of the object; and rolling the object via the plurality of rollers.

BRIEF DESCRIPTION OF THE DRAWINGS

Various other objects, features and advantages of the present invention will become fully appreciated when considered in conjunction with the accompanying drawings, wherein like reference characters denote the same or similar parts throughout the several views.

DETAILED DESCRIPTION OF EMBODIMENTS

Figure 1:
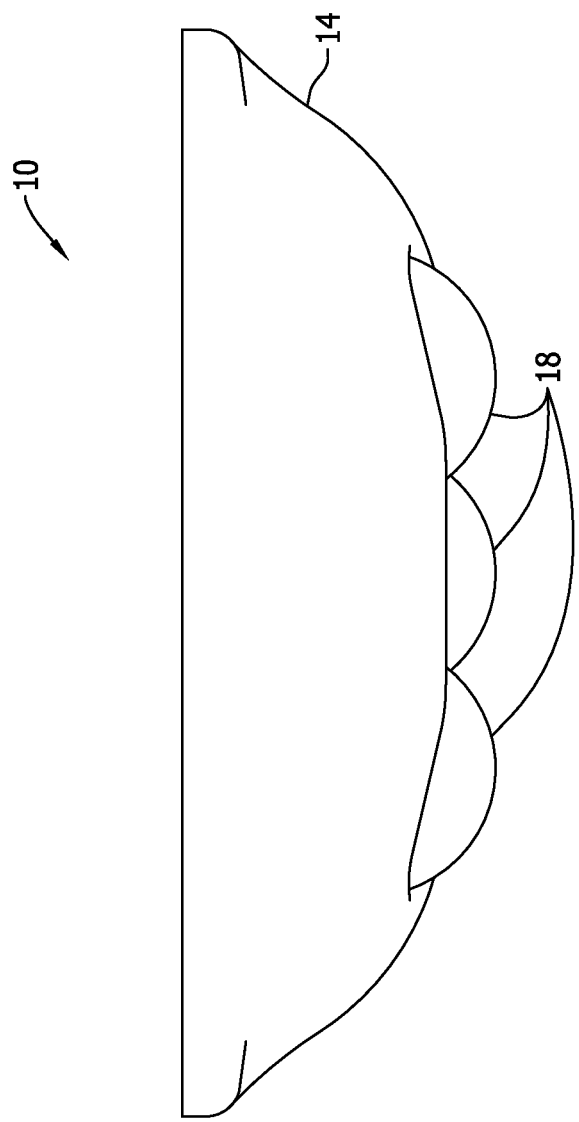
FIG. 1 illustrates a side view of a caster assembly according to the present invention.

Referring to the drawings, wherein like reference numbers refer to like components, FIG. 1 shows a side view of a caster assembly 10 according to the present invention. The caster assembly 10 includes a base 14 with one or more rollers 18 protruding from the base 14. In this embodiment, the assembly 10 includes three rollers 18. However, any number of rollers 18 may be employed. The rollers 18 may be formed from a hard plastic material such as, but not limited to, HDPE, PVC, and the like. In other embodiments, other materials may be used such as metals or composite materials.

The base 14 is configured to selectively attach to an object to be moved (a "vehicle") between the object and the surface upon which the object is to be moved (for example, the floor or ground). Selective attachment may be effected using double-sided adhesive, such as heavy-duty double-sided adhesive, or in any other suitable manner such as a hook and loop fastener, sliding-groove fastener, and the like. In other embodiments, the base 14 may be configured to attach to the surface such that the object may be moved over the surface.

In this embodiment, the rollers 18 may be omnidirectional, load-bearing spherical balls. Design parameters (e.g., size, shape, material, etc.) for the rollers 18 may be influenced by the type of surface upon which the vehicle is intended to travel, as well as the magnitude and type of vehicle to be moved. Of course, in other embodiments, the rollers may be cylindrical, such as a wheel, and may facilitate movement in a single direction.

Figure 2:
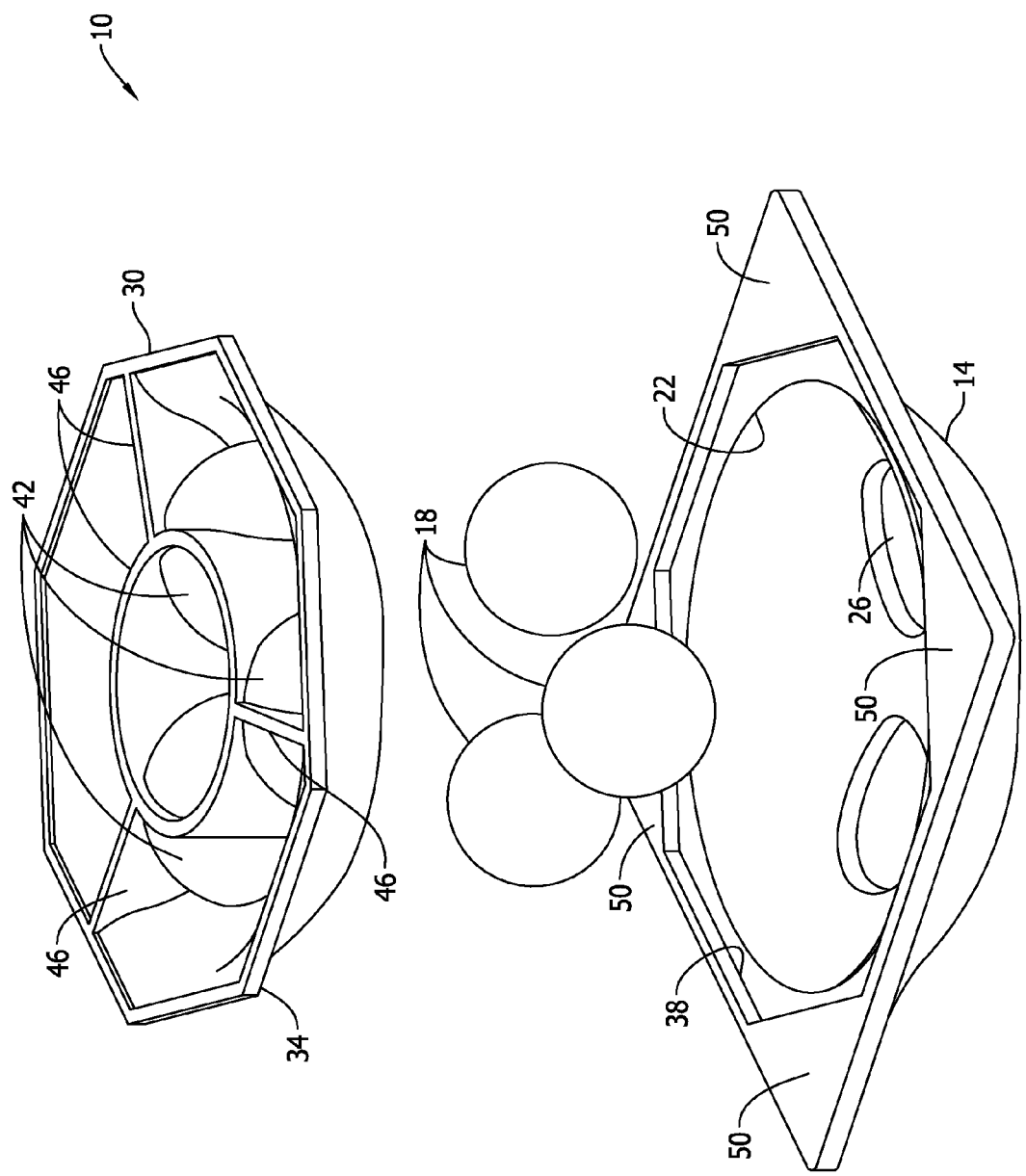
FIG. 2 illustrates an exploded perspective view of the caster assembly of FIG. 1.

Turning to FIG. 2, an exploded perspective view of the caster assembly 10 is depicted. The base 14 defines a cavity 22 including openings 26. The rollers 18 are designed to seat within the cavity 22 and extend through the base 14 at the openings 26 when the caster assembly 10 is attached to the vehicle.

A retainer 30 is designed to nest within the cavity 22. In one embodiment, the retainer 30 comprises a lip 34 that is seated within a recess 38 formed within the base 14. The retainer 30 defines one or more concavities 42 configured to correspond with the shape of the rollers 18. The roller-shaped concavities 42 are designed to align with the openings 26 when the retainer 30 is fully seated within the base 14. The rollers 18 thus seat within the cavity 22, with each roller 18 nesting within a corresponding concavity 42. The retainer 30 also includes supporting portions 46 designed to reinforce the retainer 30 and the concavities 42, while also allowing a user to more easily handle the retainer 30 during assembly.

The base 14 and retainer 30 are both formed a durable, lightweight plastic material. Suitable materials may include phenolics, acetals, Teflon (PTFE), ultra-high molecular weight polyethylene (UHMWPE), nylon, and so forth. In other embodiments, other materials may be used such as metals or composite materials. Suitable materials will provide sufficient structural support to the caster 10 while also providing a smooth, low-friction surface finish to minimize the friction between the rollers 18, openings 26, and concavities 42.

Figure 3:
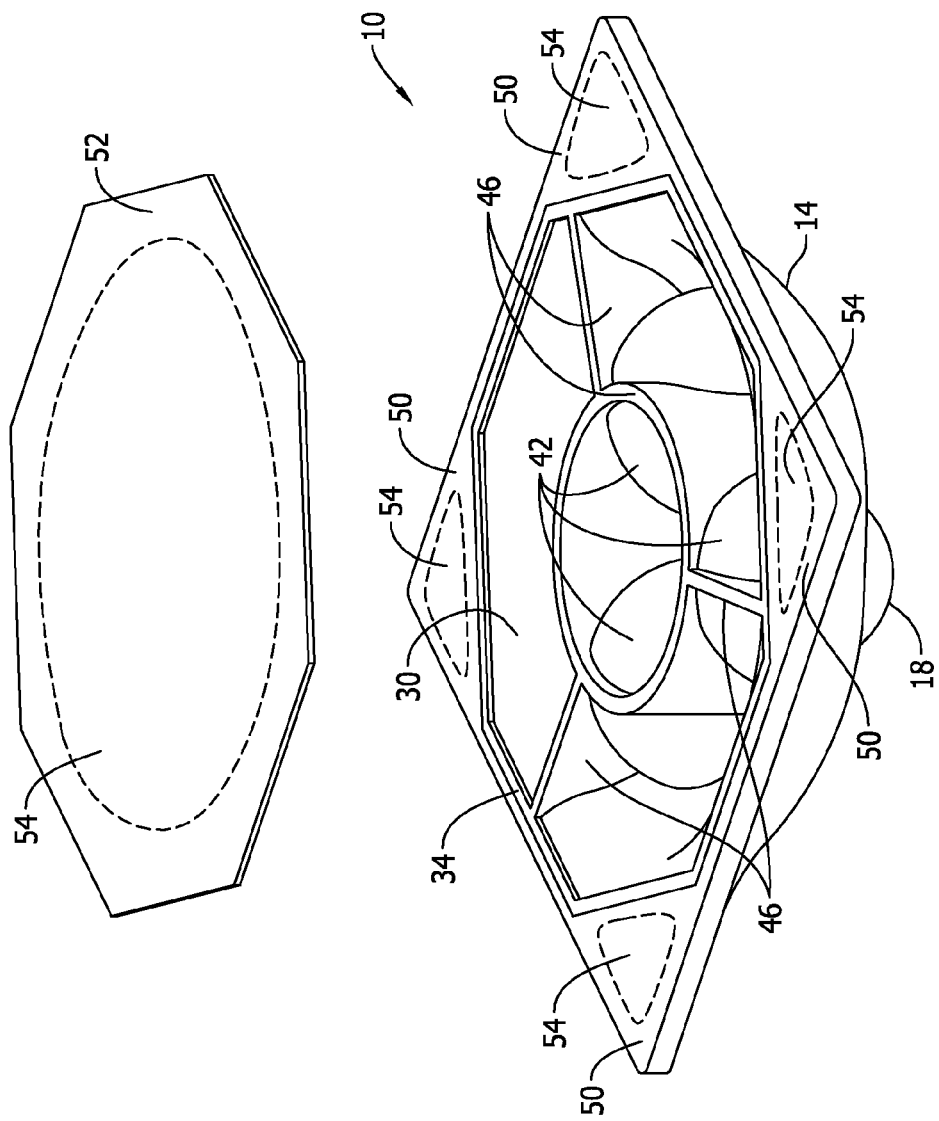
FIG. 3 illustrates a perspective view of the caster assembly of FIG. 1.
Figure 4:
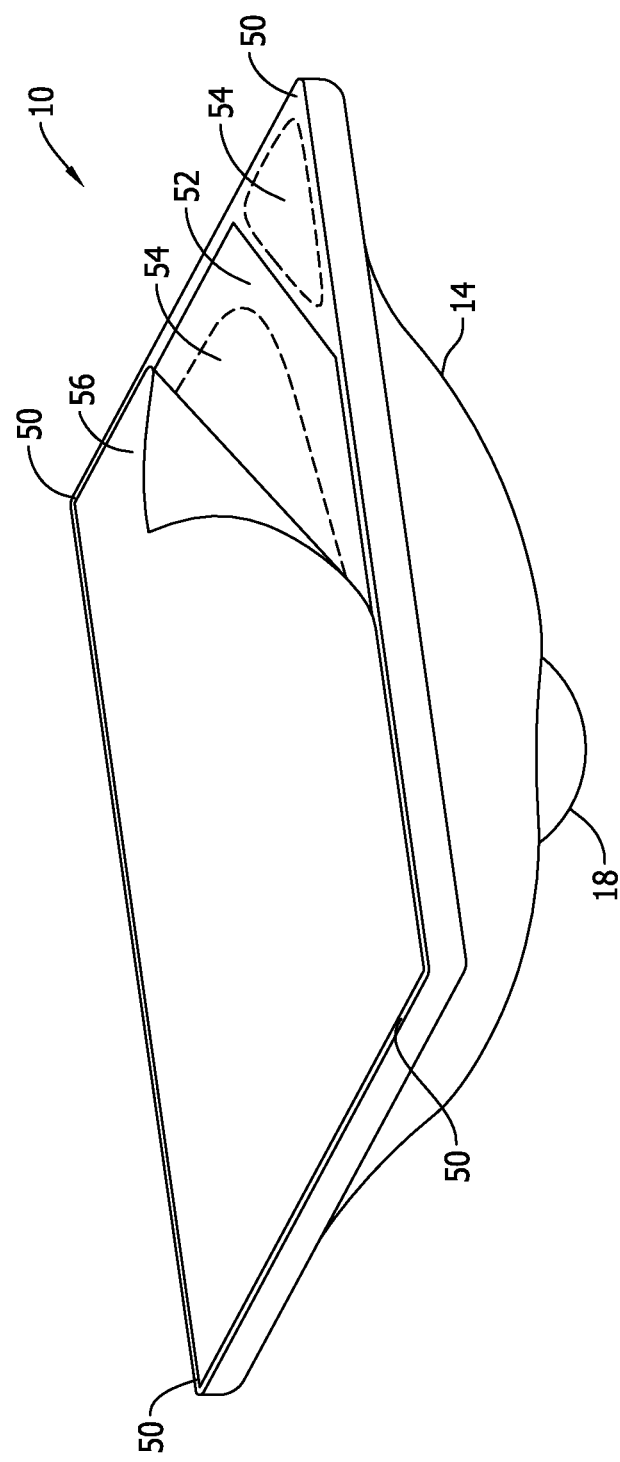
FIG. 4 illustrates another perspective view of the caster assembly of FIG. 1.

Turning to FIGS. 3 and 4, the retainer 30 is designed to seat fully within the retainer-shaped cavity 22 without protruding from a plane defined by attachment surfaces 50 of the base 14. In some embodiments, an optional cover 52 may also be fitted over the retainer 30 so as to be co-planar with the attachment surfaces 50. In embodiments with the cover 52, the lip 34 may optionally be omitted. The retainer 30 or the optional cover 52 may be configured to snap-fit within the cavity 22 of the base 14 to secure the retainer 30 within the cavity 22. Other mechanisms may also be utilized such as threads, force-fits, adhesives, etc. to secure the retainer 30 in the base 14. In another embodiment, the cover 52 may be formed integrally with the retainer 30.

Selective attachment of the caster assembly 10 to the vehicle may occur at one or more attachment portions 50 and on an outer surface of the optional cover 52. In one embodiment, an adhesive 54 is applied at the attachment portions 50 and on the optional cover 52 to adhere the caster 10 to an object to be moved. Such adhesives may include any suitable adhesives such as a double-sided adhesive or tape, glues, epoxies, and the like. A protective adhesive peel 56 may be placed over the adhesive 54 to protect the adhesive 54 until it is intended to be used. In this manner, the caster 10 cannot adhere to anything until after the adhesive peel 56 is removed. Once the peel 56 is peeled away, then the caster 10 may be adhered to the object to be moved.

In other embodiments, one side of a hook and loop fastener may be adhered to the attachment portions 50. Alternatively, the attachment surfaces may be configured to form keyed protrusion that is received in a corresponding groove on the object to be moved. Other suitable attachments for the caster system 10 may be utilized.

When the caster assembly 10 is attached to the vehicle, the vehicle blocks the cavity 22, thereby further maintaining the position of the retainer 30 with respect to the base 14. Up and down motion of the rollers 18 is thus restrained by the concavities 42 and, when the assembly 10 is in use, the surface upon which the vehicle is traveling. The low friction between the rollers 18, openings 26, and concavities 42 allow the rollers 18 to roll, facilitating the caster assembly 10 to significantly ease movement of the vehicle along a surface.

Figure 5:
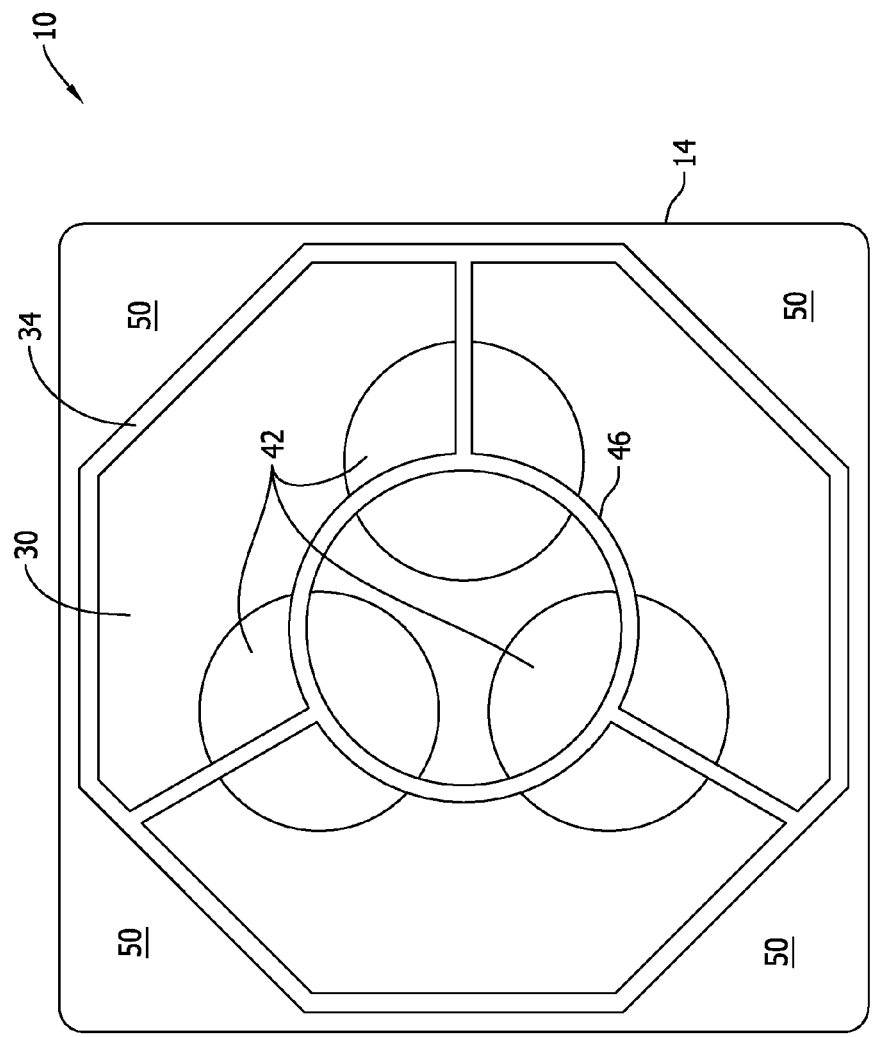
FIG. 5 illustrates a top view of the caster assembly of FIG. 1.

FIG. 5 shows a top view of the caster assembly 10. While the retainer 30 and the retainer-shaped cavity 22 are shown having an octagonal shape, any shape of retainer 30 may be used within the scope of the present invention. The concavities 42 are shaped to correspond to the rollers 18. In this embodiment, the concavities 42 are spherical to match the spherical, ball-shaped rollers 18. The supporting portions 46 of the retainer 30 can also be seen from this view.

Figure 6:
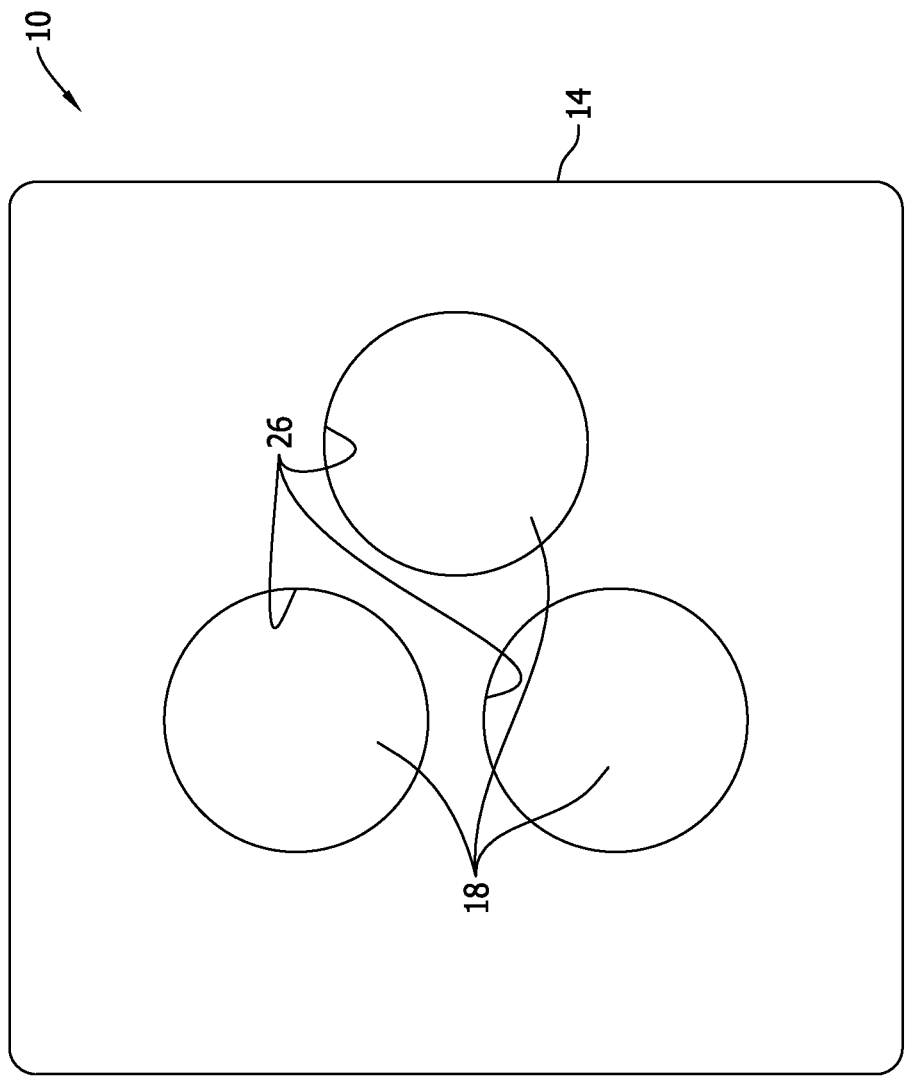
FIG. 6 illustrates a bottom view of the caster assembly of FIG. 1.
Figure 7:
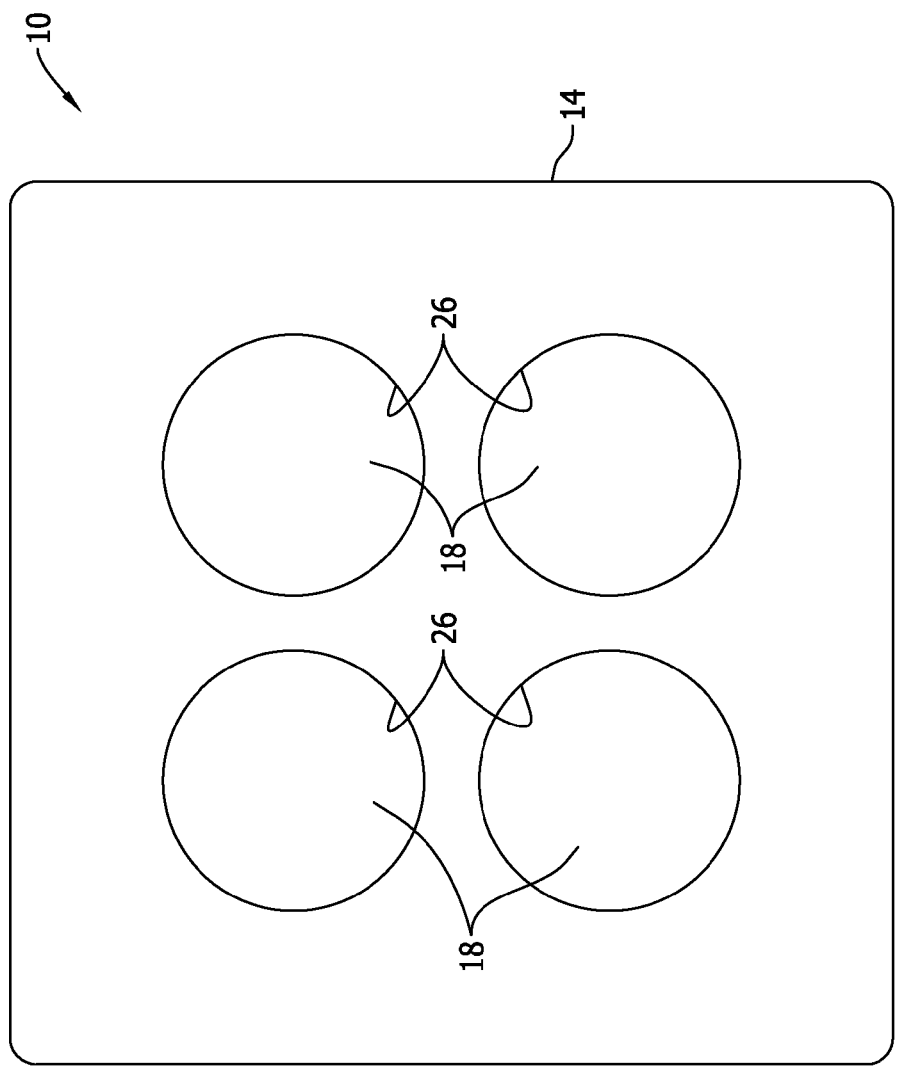
FIG. 7 illustrates a bottom view of another exemplary embodiment of a caster assembly.

FIG. 6 shows a bottom view of the caster assembly 10, with the rollers 18 extending through the openings 26 in the base 14. As explained above, any number of rollers 18 may be utilized. FIG. 7 shows a bottom view of another embodiment of the caster assembly 10 where four rollers 18 extend through the openings 26 in the base 14.

Once assembled, the caster system 10 has a low profile. That is, the assembled caster system 10 is substantially wider and longer than it is tall. For example, a ratio of the length to height may be at least 2:1 in some embodiments, 4:1 in some embodiments, and 6:1 or more in some embodiments.

The low profile of the caster system 10 enables the caster system 10 to be attached to the vehicle via the adhesive 54. Because adhesives generally have a higher shear strength than a tensile or peel strength, the low profile of the caster 10 ensures that the forces between the caster 10 and the vehicle will be primarily in shear. Thus, the caster 10 may be effective even without permanent or semipermanent fasteners such as those used with traditional casters.

The low profile of the caster system 10 further enables the caster 10 to be used on many different surfaces. Specifically, the low profile allows the caster 10 to absorb bumps and gaps of a surface if used on the ground outdoors or other bumpy surface. The caster 10 may also be suitable for use as a slider along carpeted surfaces. Furthermore, because the rollers are plastic, the rollers do not cause damage to surfaces over which they roll.

Because the materials used for the caster 10 are lightweight and inexpensive, the caster 10 may be configured as a single-use caster that is disposable. As explained above, the caster 10 may comprise a completely plastic construction. Therefore, the caster 10 may be adhered to shipping packages and may be disposed of along with the package after delivery. The plastics used may also be coded for recycling and may be recycled after use.

In another embodiment, the casters 10 may be integrated into a box or pallet for shipping. For example, corners of a box or pallet may include a cut-out to facilitate the placement of the caster 10.

While the various modes for carrying out the invention have been described in detail, it is to be understood that the terminology used is intended to be in the nature of words and description rather than of limitation. Those familiar with the art to which this invention relates will recognize that many modifications of the present invention are possible in light of the above teachings. It is therefore to be understood that within the scope of the appended claims, the invention may be practiced in a substantially equivalent way other than as specifically described herein.

What is claimed is:

1. A low profile caster comprising:
    a plurality of rollers positioned coplanar to one another and defining a first plane;
    a base including a plurality of openings through which the plurality of rollers protrude, the base forming a cavity within an upper surface thereof;
    a retainer disposed within the cavity formed by the base and over the plurality of rollers, the retainer maintaining a position of the rollers protruding through the openings, the retainer comprising at least one reinforcing member such that the at least one reinforcing member extends in a direction away from the plurality of rollers; and
    at least one attachment surface comprising an adhesive, the attachment surface being configured to adhere the caster to an object to be moved, wherein a ratio of a width of the caster to a height of the caster is greater than 2:1.

2. The low profile caster according to claim 1, wherein the ratio is greater than 4:1.

3. The low profile caster according to claim 1, wherein the at least one attachment surface is a planar surface.

4. The low profile caster according to claim 3, wherein the at least one attachment surface is planar and configured to be parallel to a surface over which the object is moved.

5. The low profile caster according to claim 1, wherein the plurality of rollers are omnidirectional rollers in a shape of a spherical balls.

6. The low profile caster according to claim 1, wherein the retainer comprises a plurality of concavities, the concavities being shaped to correspond with the plurality of rollers, and the concavities covering the plurality of rollers.

7. The low profile caster according to claim 1, wherein the plurality of rollers are formed from a plastic material.

8. The low profile caster according to claim 7, wherein the retainer and the base are formed from low-friction, plastic materials.

9. The low profile caster according to claim 1, further comprising a peelable adhesive cover that is disposed over the adhesive, the peelable adhesive cover being removable from the adhesive.

10. A method of moving an object comprising:
    obtaining at least one low profile disposable caster; the low profile caster comprising:
        a plurality of rollers;
        a base including a plurality of openings through which the plurality of rollers protrude and a planar attachment portion, the base having an exterior surface forming a curved, rounded profile extending at least 50% of a distance from the openings to the planar attachment portion;
        a retainer disposed over the base and the plurality of rollers, the retainer maintaining a position of the rollers protruding through the openings such that the retainer comprises at least one reinforcing member extending to the planar attachment portion;
        at least one attachment surface disposed on the planar attachment portion, the attachment surface including adhesive, the attachment surface being configured to adhere the caster to the object to be moved; and
        a peelable adhesive cover that is disposed over the adhesive, the peelable adhesive cover being removable from the adhesive;
    removing the peelable adhesive cover disposed over the adhesive;
    adhering the at least one low profile to a surface of the object; and
    rolling the object via the plurality of rollers.

* * * * *